United States Patent Office 3,709,725
Patented Jan. 9, 1973

3,709,725
PROCESS OF PRODUCING TEXTILE GOODS COATED WITH FOAMED POLYVINYL CHLORIDE
Joachim Schabel and Hans-Peter Liebegott, Bremen, Germany, assignors to DS-Chemie GmbH & Co. KG, Bremen, Germany
No Drawing. Filed June 11, 1970, Ser. No. 45,583
Claims priority, application Germany, May 14, 1970, P 20 23 742.7
Int. Cl. C08f 47/08; C08g 22/44
U.S. Cl. 117—161 UF 7 Claims

ABSTRACT OF THE DISCLOSURE

There is provided a process for producing textile goods (especially rugs and carpets) which are coated on the reverse side with foamed polyvinyl chloride. In this process stabilised polyvinylchloride paste containing plasticiser and provided with filler is applied on the textile goods on one side and is gelled by heating. There is added to the polyvinylchloride paste a compound which is stable per se and which is capable of taking up electrons, together with a peroxide compound which is capable of reacting with the paste at approximately room temperature.

---

This invention relates to a process for producing textile goods (especially rugs and carpets) which are coated on the reverse side with foamed polyvinyl chloride.

In a known process of this type the polyvinyl chloride paste contains a propellant which is heated to give off a propellant gas, thus leading to the formation of a foam. In this case the treatment temperature must be relatively high because a sufficient decomposition pressure must be created for evolution of the gas. However, modern textile goods, particularly rug and carpet materials, are often produced from plastics fibres which do not permit such a high-temperature treatment without damage. Mechanical foaming of a polyvinyl chloride paste (by beating) is also known, the paste then being applied in the foamed state. In so doing one can indeed undertake the whole process at a lower temperature, yet the mechanical beating process presupposes a relatively thin liquid paste with a viscosity of about 8,000 to 15,000 centipoises in which air or another gas can be entrapped. The addition of fillers (normally a ground rock powder) is therefore limited, because the fillers increase the viscosity considerably. Normally, approximately 10 to 25 parts of filler can be added to 100 parts of polyvinyl chloride. The mechanically foamed paste consequently becomes relatively expensive, in so far as a filler addition is necessary for reasons of quality and yet, because of the limitation reference to above, sufficient fillers cannot be added for optimum quality.

It has indeed already been proposed to use in the polyvinyl chloride paste a solution containing a small percentage of water and/or a solution essentially containing water and then to heat the paste to a temperature of only approximately 100° C. At the boiling temperature of 100° C., the water evaporates and leads to a foam-like formation of pores. In this case the resultant foam is however relatively coarse-pored, because the pore volume, starting from small pores, gradually increases during the heating process.

Finally, the coatings produced in accordance with the above described processes are all flexible. As a result of this flexibility, rugs and carpets, can move rather easily and then, if the coating is thick in the interests of good heat and sound insulation, are too soft to walk on.

The object of the present invention is to provide a process for producing textile goods with foamed polyvinyl chloride backing in which, on the one hand, a uniform as well as a fine-pored foam is obtained, and on the other hand, the paste can contain substantially more filler than is possible in the case of the known beating process for producing foam. Moreover with the invention, the foam coating is also substantially more compact so that the disadvantages arising with regard to the lacking in compactness of conventional foam coatings are overcome.

In accordance with the present invention there is provided a process for producing textile goods having a foamed polyvinyl chloride backing in which there is added to a polyvinyl chloride paste containing plasticizer and provided with filler a compound which is stable per se and which is capable of taking up electrons, followed by the addition to the paste of a peroxide compound which is capable of reacting with the paste at approximately room temperature, the peroxide compound being added directly before the application of the paste to the textile goods. The paste is applied onto textile goods on one side following which the paste is gelled by heating.

A process according to the present invention will now be more particularly described. In this process, there is added to a polyvinyl chloride paste a compound which is stable per se and which is capable of taking up electrons. Certain salts are particularly suitable as compounds capable of taking up electrons and which per se (i.e. without the influence of peroxide compounds) are stable. Thus the compounds $Pb_3(PO_3)_2$, $FeSO_4$, $NaHSO_3$, $Na_2SO_3$, $CuCl$ or the like can be used. Even organic compounds, such as hydroxylamine in the form of a corresponding salt are suitable. A peroxide compound, particularly hydrogen peroxide or an organic peroxide, such as benzoyl peroxide, butyl perbenzoate and the like (having good solubility in plasticizers) is also added to the polyvinyl chloride paste. Even peroxide disulphates and perborates can be added to the extent of their solubility.

The quantity added is very small in every case. Thus in the case of a PVC paste of a homopolymeric PVC approximately 0.5% of lead phosphite and 0.5-2% of an approximately 30% perhydrol solution are sufficient. 5 to 35% hydrogen peroxide solutions can also be used in corresponding quantity. The paste is itself of course stabilised and the stabiliser to be employed must not, however, react with the peroxide compound and ought, if necessary to be present in corresponding stoichiometric excess or retain its stabilization effect on taking up electrons.

Preferably both compounds, that is, the compounds capable of taking up electrons and the peroxide compound are added in chronological sequence in order to prevent spontaneous foaming. It is particularly advantageous if the peroxide compound is added directly before the application of the paste onto the textile goods since the foaming in the paste can be waited for and then the paste can be spread on in the foamed state in any manner known per se as by means of a doctor blade or the like.

An advantageous embodiment of the invention, however, provides for the paste to be led in an unfoamed state up to the place of its application, the foaming reaction then being controlled in such a manner that the foaming starts after spreading by the doctor blade and is concluded substantially in the middle of a heating or gelling channel or chamber. This procedure has the advantage that a reliable wetting of the fibres of the textile goods with the paste results before foaming commences. However, a spontaneous foaming before application to the textile material can be prevented by chemical means. Thus, when using 0.5% of lead phosphite the foaming proceeds so slowly that a good coating on the textile goods can still be effected.

Spontaneous foaming is also avoided by there being added to the paste as an emulsifier an anionic active substance with only neutral to weak alkali reaction in the usual amount. Furthermore, spontaneous foaming can be counteracted by the total contents of the paste in non-ionogenic emulsifiers with weak acid reaction being limited to 1% at most. If necessary therefore the polyvinyl chloride provided for the production of the paste must also be washed out extensively beforehand in order to eliminate to any great extent the last named emulsifiers which are still contained therein.

Furthermore, since the polyvinyl chloride paste is already foamed before gelling is effected, the gelling or warming process can be undertaken particularly advantageously at a temperature lying between 100° C. and 150° C. so that low temperature gelling pastes can be used. Moreover, the foaming can be controlled so that the foam has very fine uniform pores and since the "beatability" of the paste does not have to be taken into consideration, a considerable quantity of fillers can be added. For example 150–200 parts by weight of fillers can be added to 100 parts of polyvinyl chloride.

Having thus described our invention what we claim as new and desire to secure by Letters Patent is:

1. A process for producing textile goods having a foamed polyvinyl chloride backing which comprises first adding to a polyvinyl chloride paste containing plasticizer and provided with filler a compound which is stable per se and which is capable of taking up electrons, then adding to the paste a peroxide compound which is capable of reacting with the paste at approximately room temperature, applying the paste onto textile goods on one side and gelling the paste by heating, the peroxide compound being added directly before the application of the paste to the textile goods.

2. A process as claimed in claim 1, wherein the paste is gelled at a temperature lying between 100° C. and 150° C.

3. A process as claimed in claim 1, wherein the contents of the paste additionally includes 1% of non ionogenic emulsifiers with weak acid reaction.

4. A process as claimed in claim 1 wherein the paste is applied in the foamed state.

5. A process as claimed in claim 1, wherein the foaming reaction is controlled in such a manner that the foaming takes place after spreading with a doctor blade and is concluded substantially by gelling or heating.

6. A process as claimed in claim 1, wherein the paste is produced from a homopolymeric polyvinyl chloride, and wherein the compound capable of taking up electrons is approximately 0.5% of lead phosphite, and the peroxide compound is 0.5–2% of a 30% perhydrol solution or a corresponding amount of a 5–35% hydrogen peroxide solution.

7. A process as claimed in claim 1, wherein there is added to the paste as emulsifier an anion active substance with neutral to weak alkali reaction.

References Cited

UNITED STATES PATENTS

| 3,170,967 | 2/1965 | Williams et al. | 260—2.5 X |
| 3,202,307 | 8/1965 | Rainer et al. | 260—2.5 X |
| 3,321,413 | 5/1967 | Riley et al. | 260—2.5 |
| 3,527,654 | 9/1970 | Jones et al. | 117—161 |
| 2,978,354 | 4/1961 | Lesser | 117—161 X |
| 3,068,118 | 12/1962 | Biskup et al. | 117—47 |
| 1,864,621 | 6/1932 | Sprunger | 117—47 |
| 2,961,332 | 11/1960 | Nairn | 117—161 X |
| 3,051,995 | 9/1962 | Ferrell et al. | 117—161 X |
| 3,054,691 | 9/1962 | Myers et al. | 117—161 X |

FOREIGN PATENTS

| 224,257 | 1/1959 | Australia | 117—161 |
| 1,026,753 | 4/1966 | Great Britain | 117—161 |

WILLIAM D. MARTIN, Primary Examiner

M. R. P. PERRONE, Assistant Examiner

U.S. Cl. X.R.

260—2.5 P; 117—111 F